(12) United States Patent
Kondo

(10) Patent No.: US 7,945,882 B2
(45) Date of Patent: May 17, 2011

(54) ASYNCHRONOUS CIRCUIT LOGICAL VERIFICATION METHOD, LOGICAL VERIFICATION APPARATUS, AND COMPUTER READABLE STORAGE MEDIUM

(75) Inventor: Naohiro Kondo, Kawasaki (JP)

(73) Assignee: Fujitsu Semiconductor Limited, Yokohama (JP)

( * ) Notice: Subject to any disclaimer, the term of this patent is extended or adjusted under 35 U.S.C. 154(b) by 596 days.

(21) Appl. No.: 12/036,516

(22) Filed: Feb. 25, 2008

(65) Prior Publication Data

US 2008/0209377 A1    Aug. 28, 2008

(30) Foreign Application Priority Data

Feb. 27, 2007    (JP) .................................. 2007-046775

(51) Int. Cl.
*G06F 17/50* (2006.01)
(52) U.S. Cl. ......... 716/106; 716/107; 716/108; 716/113
(58) Field of Classification Search .................. 716/5–6, 716/106, 107, 108, 113
See application file for complete search history.

(56) References Cited

U.S. PATENT DOCUMENTS

| | | | |
|---|---|---|---|
| 6,658,635 B1 * | 12/2003 | Tanimoto | 716/6 |
| 2001/0029599 A1 * | 10/2001 | Minami et al. | 716/6 |
| 2005/0216247 A1 * | 9/2005 | Ikeda et al. | 703/19 |

FOREIGN PATENT DOCUMENTS

| | | |
|---|---|---|
| JP | 2001-229211 | 8/2001 |
| JP | 2003-233628 | 8/2003 |
| JP | 2004-185311 | 7/2004 |
| JP | 2005-284426 | 10/2005 |

* cited by examiner

*Primary Examiner* — Vuthe Siek
(74) *Attorney, Agent, or Firm* — Staas & Halsey LLP

(57) ABSTRACT

A verification method for verifying an asynchronous circuit includes producing a netlist based on circuit information at a register transfer level, extracting delay information and an asynchronous circuit section in which circuits operating with different clock signals are coupled to each other from the netlist, processing the delay information to extend a malfunction generating period in the asynchronous circuit section, and executing verification of the asynchronous circuit based on the delay information having been processed.

12 Claims, 15 Drawing Sheets

```
always @(posedge CK1 or negedge XRST)begin
  if(XRST == 1'b0)
        C <= 1'b0;
  else begin
        if(A == 1'b1) begin
            C <= B;
        end
    end
end
```

FIG. 7

```
(CELL
    (CELLTYPE "FF1")
    (INSTANCE A_reg)
    (DELAY (ABSOLUTE
        (IOPATH CLK Q (50:100:200) (50:100:200))
        (IOPATH RB Q () (50:100:200)
    ))
        (TIMINGCHECK
            (WIDTH (negedge CLK) (450:500:600))
            - - - -
        )
)
(CELL
    (CELLTYPE "FF1")
    (INSTANCE B_reg)
    (DELAY (ABSOLUTE
        (IOPATH CLK Q (50:100:200) (50:100:200))
        (IOPATH RB Q () (50:100:200)
    ))
        (TIMINGCHECK
            (WIDTH (negedge CLK) 450:500:600))
            - - - -
        )
)
(CELL
    (CELLTYPE "FF1")
    (INSTANCE C_reg)
    (DELAY (ABSOLUTE
        (IOPATH CLK Q (50:100:200) (50:100:200))
        (IOPATH RB Q () (50:100:200)
    ))
        (TIMINGCHECK
            (WIDTH (negedge CLK) (450:500:600))
            - - - -
        )
)
(CELL
    (CELLTYPE "INV1")
    (INSTANCE INV_1)
    (DELAY (ABSOLUTE
        (IOPATH A X (50:100:200) (50:100:200))
    ))
)
(CELL
    (CELLTYPE "OR2")
    (INSTANCE OR_1)
    (DELAY (ABSOLUTE
        (IOPATH A 1 X (50:100:200) (50:100:200))
        (IOPATH A 2 X (50:100:200) (50:100:200))
    ))
)
(CELL
    (CELLTYPE "OR2")
    (INSTANCE OR_2)
    (DELAY (ABSOLUTE
        (IOPATH A 1 X (50:100:200) (50:100:200))
        (IOPATH A 2 X (50:100:200) (50:100:200))
    ))
)
(CELL
    (CELLTYPE "AND2")
    (INSTANCE AND_1)
    (DELAY (ABSOLUTE
        (IOPATH A 1 X (50:100:200) (50:100:200))
        (IOPATH A 2 X (50:100:200) (50:100:200))
    ))
)
```

FIG. 9
```
(CELL
    (CELLTYPE "FF1")
    (INSTANCE A_reg)
    (DELAY (ABSOLUTE
        (PORT DATA (1:1:1) (1:1:1))
        (IOPATH CLK Q (0:0:0) (0:0:0))
        (IOPATH RB Q () (0:0:0)
    ))
        (TIMINGCHECK
            (WIDTH (negedge CLK) (450:500:600))
        )
)
(CELL
    (CELLTYPE "FF1")
    (INSTANCE B_reg)
    (DELAY (ABSOLUTE
        (PORT DATA (1:1:1) (1:1:1))
        (IOPATH CLK Q (0:0:0) (0:0:0))
        (IOPATH RB Q () (0:0:0)
    ))
        (TIMINGCHECK
            (WIDTH (negedge CLK) (450:500:600))
        )
)
(CELL
    (CELLTYPE "FF1")
    (INSTANCE C_reg)
    (DELAY (ABSOLUTE
        (PORT DATA (1:1:1) (9999:9999:9999))
        (IOPATH CLK Q (0:0:0) (0:0:0))
        (IOPATH RB Q () (0:0:0)
    ))
        (TIMINGCHECK
            (WIDTH (negedge CLK) (450:500:600))
        )
)
(CELL
    (CELLTYPE "INV1")
    (INSTANCE INV_1)
    (DELAY (ABSOLUTE
        (IOPATH A X (0:0:0) (0:0:0))
    ))
)
(CELL
    (CELLTYPE "OR2")
    (INSTANCE OR_1)
    (DELAY (ABSOLUTE
        (IOPATH A 1 X (0:0:0) (0:0:0))
        (IOPATH A 2 X (0:0:0) (0:0:0))
    ))
)
(CELL
    (CELLTYPE "OR2")
    (INSTANCE OR_2)
    (DELAY (ABSOLUTE
        (IOPATH A 1 X (0:0:0) (0:0:0))
        (IOPATH A 2 X (0:0:0) (0:0:0))
    ))
)
(CELL
    (CELLTYPE "AND2")
    (INSTANCE AND_1)
    (DELAY (ABSOLUTE
        (IOPATH A 1 X (0:0:0) (0:0:0))
        (IOPATH A 2 X (0:0:0) (0:0:0))
    ))
)
```

```
always @(posedge CK1 or negedge XRST)begin
   if(XRST == 1'b0)
        C <= 1'b0;
    else begin
        if(A == 1'b1) begin
            C <= 1'b1;
            end
        else if(B == 1'b1) begin
            C <= 1'b0;
            end
        end
end
```

ASYNCHRONOUS CIRCUIT LOGICAL VERIFICATION METHOD, LOGICAL VERIFICATION APPARATUS, AND COMPUTER READABLE STORAGE MEDIUM

CROSS-REFERENCE TO RELATED APPLICATIONS

This application is based upon and claims the benefit of priority from each of the prior Japanese Patent Application No. 2007-46775 filed on Feb. 27, 2007, the entire contents of which are incorporated herein by reference.

BACKGROUND

1. Field

The embodiments discussed herein are directed to a verification method, a verification apparatus, and a program, and more particularly to a verification method, a verification apparatus, and a program, which are suitable for verifying an asynchronous circuit.

2. Description of the Related Art

Operations of semiconductor integrated circuits are required to be verified through simulation with higher accuracy in a shorter time due to more-advanced functions and higher packing densities of the semiconductor integrated circuits. In particular, it has become more important recently to perform verification of an asynchronous circuit, which verifies a malfunction generated at an asynchronous point where circuit sections operating with different clock signals are connected to each other.

FIG. 1 is a flowchart illustrating a flow of circuit design and verification in the related art.

FIG. 1 also illustrates databases 80, 81, 82 and 83 for storing various kinds of data produced during circuit design and verification in the related art.

In circuit design for an LSI (Large Scale Integrated Circuit), the logical function of the circuit is first described at a register transfer level (RTL) by using a hardware description language (HDL) (operation S80). Then, logical verification is performed through RTL simulation to confirm the logical functional operation of the circuit (operation S81). If the logical functional operation is not what was expected, the flow returns to operation S80 in which the logical function of the circuit is described again at the RTL.

If the logical functional operation is what was expected, logical synthesis is executed to produce a netlist at a gate level (operation S82).

Then, formal verification (logical equivalence verification) of the circuit description between the netlist and the RTL is executed to confirm that the logic in the produced netlist is equivalent to the logic at the RTL (operation S83). If the logic in the produced netlist is not equivalent to the logic at the RTL, the flow returns to operation S80. In operation S80, the logical function of the circuit is described again at the RTL.

If the logical equivalence is confirmed, layout is executed to produce a netlist and delay information in SDF (Standard Delay Format) of actual wiring that is subjected to timing adjustment, addition of a test circuit, etc. (operation S84).

Then, the logical functional operation of the circuit and timing specs are confirmed based on the netlist and the delay information of the actual wiring. The logical functional operation of the circuit and timing specs are confirmed by performing timing verification by using a static timing analyzer (STA), as well logical verification and timing verification through dynamic simulation at a gate level (operation S85). If the timing specs are not satisfied, the flow returns to operation S80. In operation S80, the logical function of the circuit is described again at the RTL.

After the logical verification and the timing verification, a prototype chip is manufactured (operation S86), and confirmation of the operation is made based on evaluation of the actual chip (operation S87). If the operation of the actual chip is not what was expected, or if there is a problem in the circuit logic, the flow returns to operation S80 in which the logical function of the circuit is described again at the RTL. If there is a problem in the timing, though not shown, the flow returns to operation S84 in which layout is executed again.

If the evaluation of the actual chip is satisfied, mass production of the chips is started (operation S88). The LSI circuit design is thus completed.

In the above-described known process of circuit design and verification, the verification of the asynchronous circuit is usually executed in the RTL stage (operation S81) (see, e.g., Japanese Laid-open patent publication No. 2005-284426, No. 2004-185311, No. 2003-233638, and No. 2001-229211).

However, the known verification of the asynchronous circuit has a problem as follows. Even when the RTL verification proves that the circuit is operated without troubles, a malfunction is generated at an asynchronous point in some cases in the stage of the netlist produced after the logical synthesis.

FIGS. 2A and 2B illustrate respectively an RTL description and an asynchronous circuit represented by the netlist produced after the logical synthesis.

The portion of the RTL described in FIG. 2A shows that a value of B is substituted in C if A is 1, in sync with the rise of a clock signal CK1. Two paths may be generated between A_reg and C_reg, as illustrated in FIG. 2B, in an asynchronous circuit that is produced by the logical synthesis and includes two kinds of clock signals CK1 (100 MHz) and CK2 (200 MHz), even if only one path exists from A to C in the RTL description. The two paths include one extending from A_reg to C_reg through OR__1 and AND__1, and the other extending from A_reg to C_reg through INV__1, OR__2 and AND__1. The following malfunction may be caused in such an asynchronous circuit.

FIG. 3 illustrates an example of the malfunction caused in the asynchronous circuit.

More specifically, FIG. 3 illustrates the simulation result of the asynchronous circuit in FIG. 2B. Note that an output signal of B_reg, i.e., B_reg.Q, is assumed to be 0 and is omitted from FIG. 3. Various signals in FIG. 3 represent corresponding signals indicated in FIG. 2B.

According to the RTL description in FIG. 2A, when B=0 and C=0 are held, a value of C does not become 1 even if a value of A takes 1. In the asynchronous circuit illustrated in FIG. 2B, however, there may cause a hazard that an input of C_reg, i.e., C_reg.DATA, becomes 1 for a short period due to a delay difference in the combined circuit. If the clock signal CK1 rises in such a period (malfunction generating period), C_reg.Q becomes 1 and a malfunction occurs. For that reason, verification of the asynchronous circuit has to be performed after the netlist has been produced.

In order to find the above-described malfunction, however, the simulation is required to be executed while changing the phase of the clock signal CK1 little by little so that the clock signal CK1 rises during the malfunction generating period. This leads to the problem that the simulation takes a very long time and has a difficulty in finding a malfunction. At present, therefore, when a malfunction is found in the stage of operation confirmation based on evaluation of the actual chip, verification is executed by measuring a phase difference of the asynchronous clocks and reproducing the malfunction through simulation based on the netlist. That verification takes a very long time and has a high cost.

SUMMARY

It is an aspect of the embodiments discussed herein to provide a verification method for verifying an asynchronous circuit, including producing a netlist based on circuit information at a register transfer level, extracting delay information and an asynchronous circuit section in which circuits operating with different clock signals are coupled to each other from the netlist, processing the delay information to extend a malfunction generating period in the asynchronous circuit section, and executing verification of the asynchronous circuit based on the delay information having been processed.

The above-described embodiments of the present invention are intended as examples, and all embodiments of the present invention are not limited to including the features described above.

BRIEF DESCRIPTION OF THE DRAWINGS

FIG. 7 illustrates an example of delay information in SDF before processing;

FIG. 9 illustrates an example of the delay information after processing;

FIG. 13A illustrates an RTL description and FIG. 13B illustrates an asynchronous circuit represented by a netlist after logical synthesis;

DESCRIPTION OF THE PREFERRED EMBODIMENTS

Figure 1:
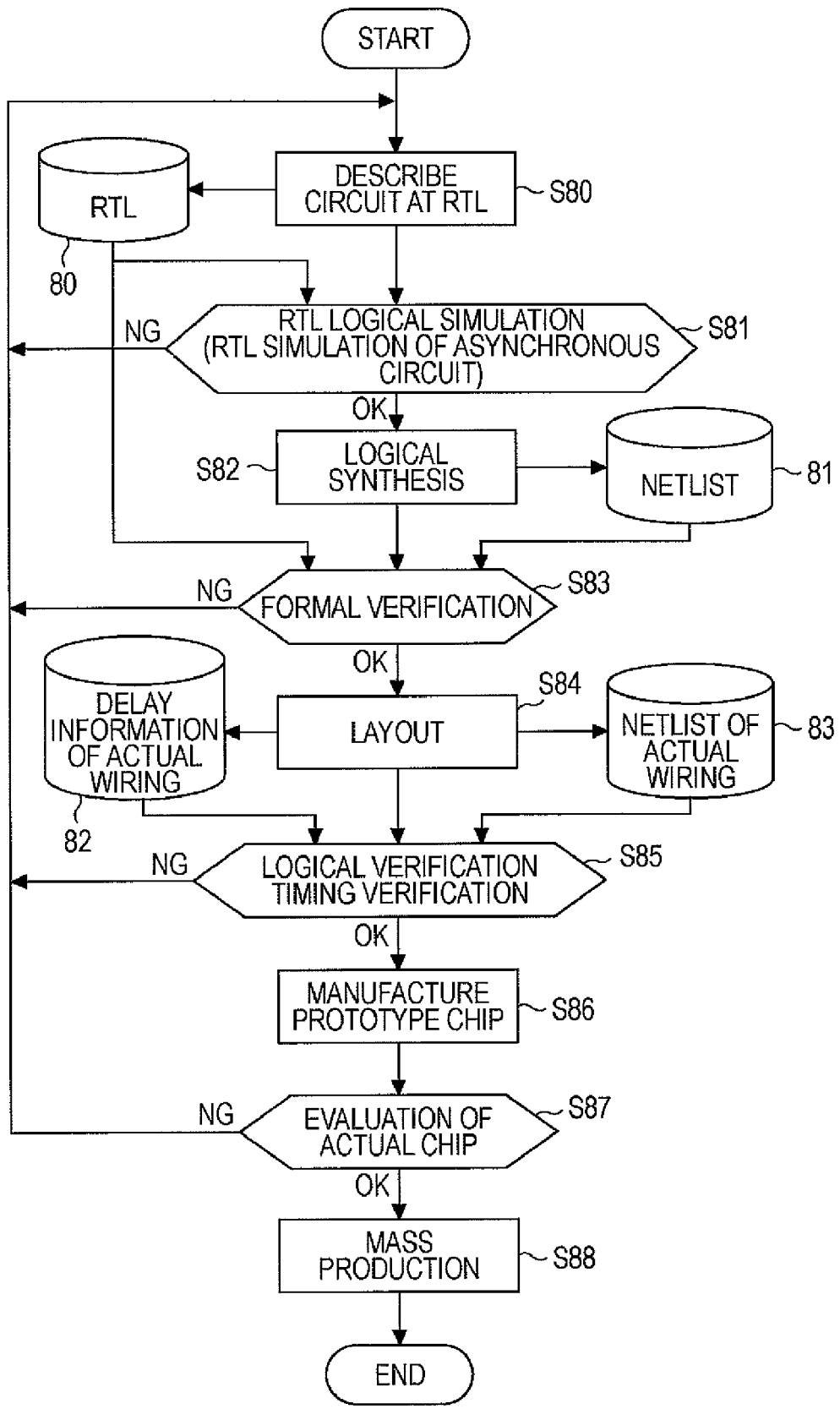
FIG. 1 is a flowchart illustrating a flow of circuit design and verification in the related art.

Reference may now be made in detail to embodiments of the present invention, examples of which are illustrated in the accompanying drawings, wherein like reference numerals refer to like elements throughout.

An embodiment will be described below with reference to the drawings.

Figure 4:
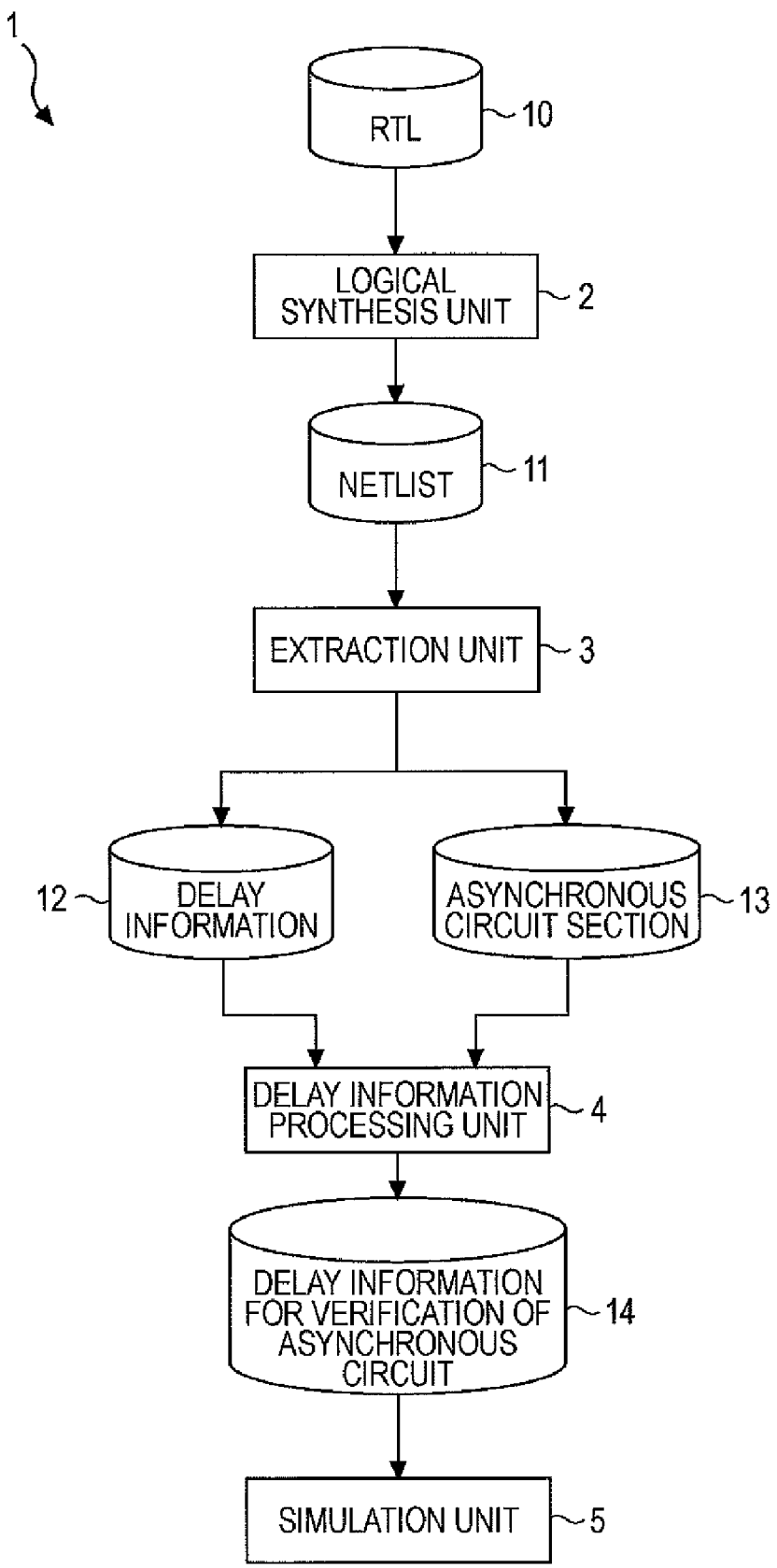
FIG. 4 illustrates an outline of a verification apparatus according to an embodiment.

FIG. 4 is a conceptual view illustrating an outline of a verification apparatus according to the embodiment.

A verification apparatus 1 comprises a logical synthesis unit 2, an extraction unit 3, a delay information processing unit 4, and a simulation unit 5. Databases 10, 11, 12, 13 and 14 serve as storage units for respectively storing circuit information in RTL description, a netlist, delay information, an asynchronous circuit section, and delay information for verification of an asynchronous circuit. Note that, while the plural databases 10-14 are separately illustrated in FIG. 4, they may be integrated into one storage unit.

The logical synthesis unit 2 produces a netlist through logical synthesis based on the circuit information in RTL description, which is stored in the database 10.

The extraction unit 3 extracts the delay information and the asynchronous circuit section from the netlist stored in the database 11.

The delay information processing unit 4 processes the delay information stored in the database 12, to thereby extend a malfunction generating period in the asynchronous circuit section that is stored in the database 13.

The simulation unit 5 performs verification of the asynchronous circuit based on the processed delay information (i.e., the delay information for the verification of the asynchronous circuit).

Figure 5:
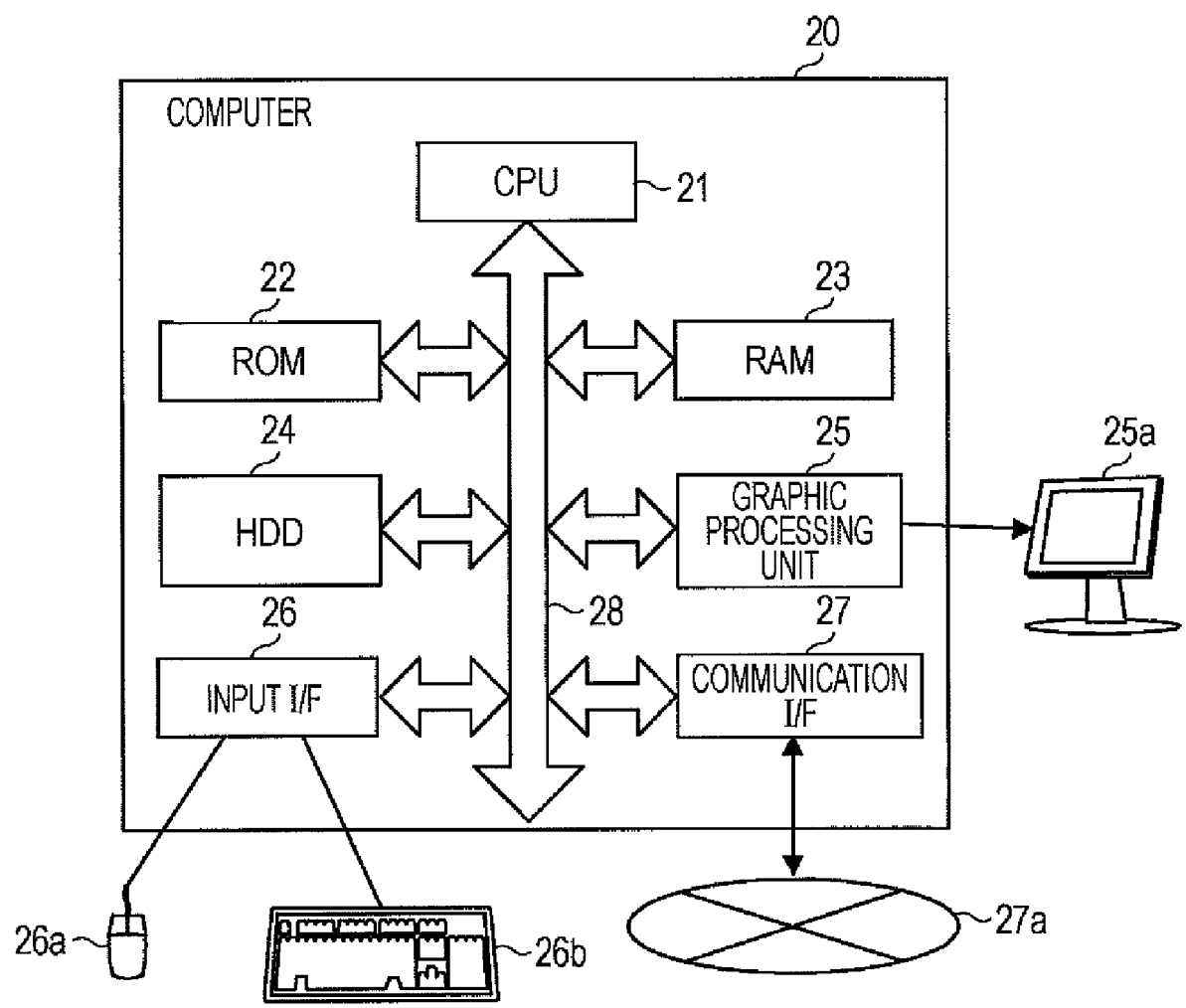
FIG. 5 illustrates an example of hardware configuration of the verification apparatus.

FIG. 5 illustrates an example of hardware configuration of the verification apparatus.

The verification apparatus 1 is constituted, for example, by a computer 20 comprising a CPU (Central Processing Unit) 21, a ROM (Read Only Memory) 22, a RAM (Random Access Memory) 23, a HDD (Hard Disk Drive) 24, a graphic processing unit 25, an input I/F (Interface) 26, a communication I/F 27, and so on. Those components are interconnected via a bus 28.

The CPU 21 controls the components in accordance with verification programs and various kinds of data which are stored in the ROM 22 and the HDD 24, thereby executing the functions of the logical synthesis unit 2, the extraction unit 3, the delay information processing unit 4, and the simulation unit 5 shown in FIG. 5.

The ROM 22 stores basic programs and data which are executed and used by the CPU 21.

The RAM 23 stores programs under execution by the CPU 21 and data under operations by the CPU 21.

The HDD 24 stores an OS (Operating System) executed by the CPU 21, programs for managing projects, various kinds of application programs, and various kinds of data. Also, the databases 10-14 illustrated in FIG. 4 may be prepared in the HDD 24.

A display device, for example, a display 25a, is coupled to the graphic processing unit 25. In accordance with a drawing command from the CPU 21, the graphic processing unit 25 displays the netlist, the verification result, etc. on the display 25a.

An input device, including a mouse 26a and a keyboard 26b, is coupled to the input I/F 26. The input I/F 26 receives information input from a user and transmits the received information to the CPU 21 via the bus 28.

The communication I/F 27 is coupled to, e.g., a LAN (Local Area Network) or a WAN (Wide Area Network) which is installed in a company, or to a network 27a, such as the Internet, for communication with other computers.

The above-described hardware configuration is merely one example. As an alternative, the verification apparatus may include a plurality of computers or may use, e.g., an emulator as the simulation unit 5.

The operation of the verification apparatus illustrated in FIG. 4 will be described below.

The logical synthesis unit 2 executes the logical synthesis to produce the netlist based on the circuit information in RTL description. The extraction unit 3 extracts the delay information in SDF as well as the asynchronous circuit section in which circuits operating with different clock signals are coupled to each other from the netlist. The delay information processing unit 4 executes a operation of processing the extracted delay information so as to extend the malfunction generating period in the asynchronous circuit section. Details of the delay information processing procedure will be described, for example, in connection with the case of processing the delay information in the asynchronous circuit illustrated in FIG. 2.

Figure 6:
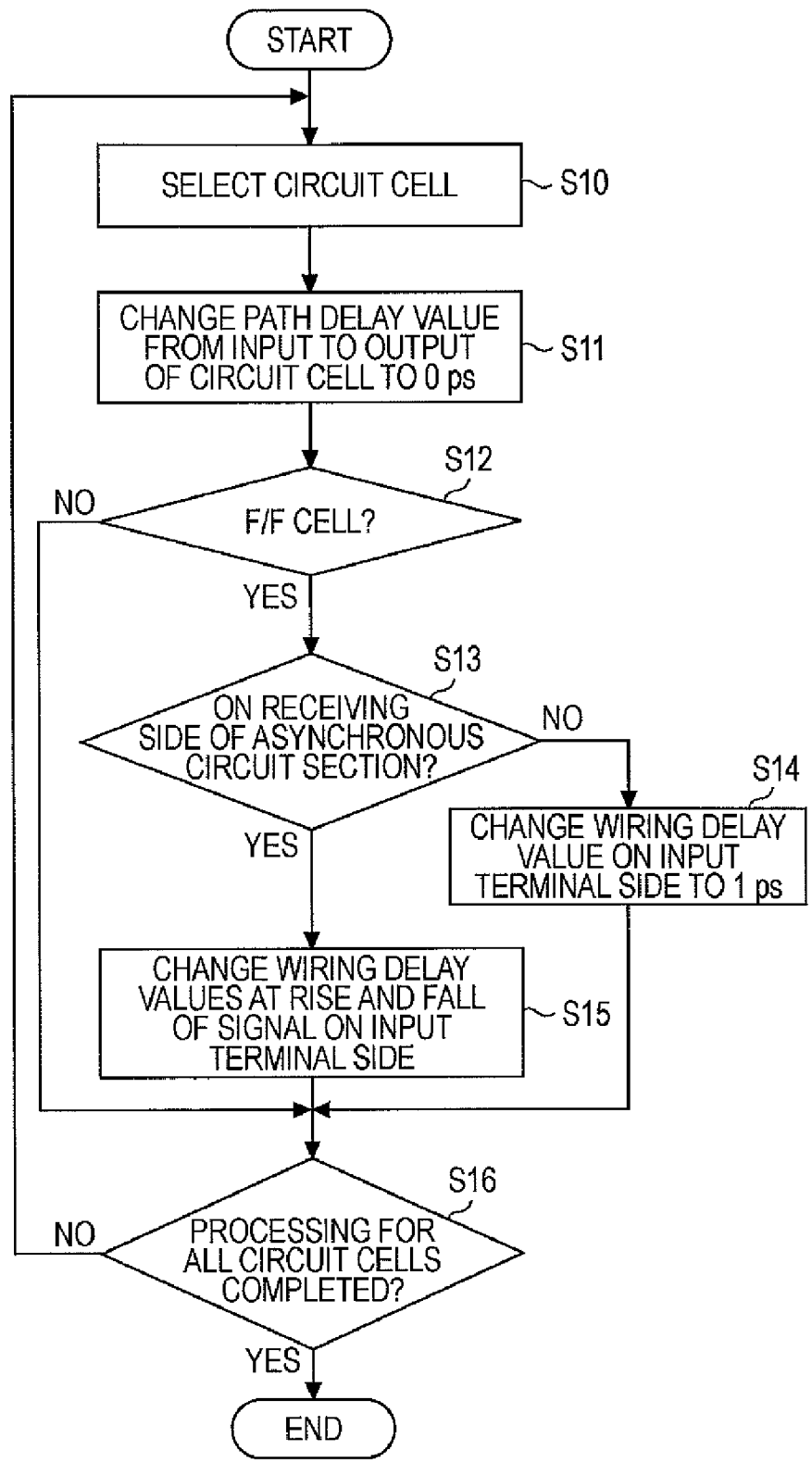
FIG. 6 is a flowchart illustrating a flow of a delay information processing procedure.

FIG. 6 is a flowchart illustrating a flow of the delay information processing procedure.

First, the delay information processing unit 4 selects, based on the extracted delay information, a circuit cell for which the delay information is to be processed (operation S10).

FIG. 7 illustrates an example of the delay information in SDF before processing.

Figures 2A, 2B:
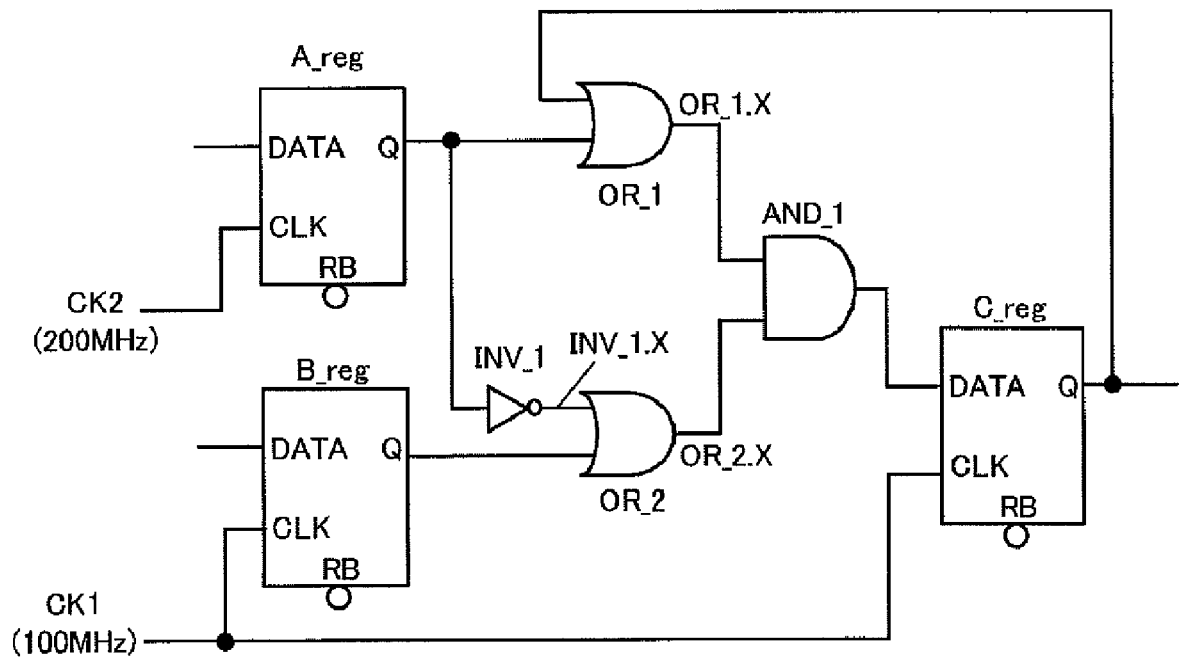
FIGS. 2A and 2B illustrate respectively an RTL description and an asynchronous circuit represented by a netlist after logical synthesis.

In other words, FIG. 7 represents the delay information of the asynchronous circuit illustrated in FIG. 2B. The delay information is described per circuit cell. Three blocks from the top in FIG. 7 describe the delay information of circuit cells each including a Flip-Flop (F/F) and correspond respectively to A_reg, B_reg and C_reg in FIG. 2B. Subsequent to the descriptions of the three F/F circuit cells, the delay information of INV_1, OR_1, OR_2, and AND_1 is described in succession.

The illustrated example of the delay information describes two sets of delay time taken until a rise of an input-side signal from 0 to 1 and a falling thereof from 1 to 0 are transmitted to an output terminal of each circuit cell. For example, "IOPATH CLK Q (50:100:200) (50:100:200)" for the circuit cell, which corresponds to A_reg, indicates that the delay time of the rise of CLK until reaching the output terminal Q has a minimum value of 50 ps, a standard value of 100 ps, and a maximum value of 200 ps, and that the delay time of the failing of CLK also has the same values.

The delay information processing unit 4 illustrated in FIG. 4 changes the path delay value of the selected circuit cell to 0 ps (operation S11 in FIG. 6).

Then, it is determined whether the selected circuit cell is a F/F cell (operation S12). If the selected circuit cell is not a F/F cell, the flow advances to a procedure of operation S16. If the selected circuit cell is a F/F cell, it is further determined whether the F/F cell is on the receiving side of the asynchronous circuit section (operation S13). In the case of the asynchronous circuit illustrated in FIG. 2B, for example, the information receiving side of the asynchronous circuit section, which is constituted by A_reg and C_reg driven by the different clock signals CK1 and CK2, is C_reg.

If the circuit cell is not the F/F cell on the receiving side of the asynchronous circuit section, a wiring delay value on the input terminal side is changed to 1 ps (operation S14). Thereafter, the flow advances to operation S16.

The reason the wiring delay value on the input terminal side is changed to 1 ps is to provide a countermeasure for a delta delay. The term "delta delay" section that the simulation result becomes indefinite, i.e., that when the rise timing of the F/F clock signal is exactly the same as the timing of change of input data, the data is determined to be either a value before the change or a value after the change depending on a simulator and a library environment. Note that it is not always required to change the wiring delay value to 1 ps. Another desired minimum setting value larger than 0 can also be set.

The minimum setting value is described as "time scale" in a file of the delay information in SDF. In simulation described later, the minimum setting value is specified based on a delay unit and delay accuracy, which are set in, e.g., a test bench for the simulation.

If the above-described countermeasure for the delta delay is not made, even the operations of the F/F cells operating with the same clock signal may differ from the intended operations.

Figure 8A:
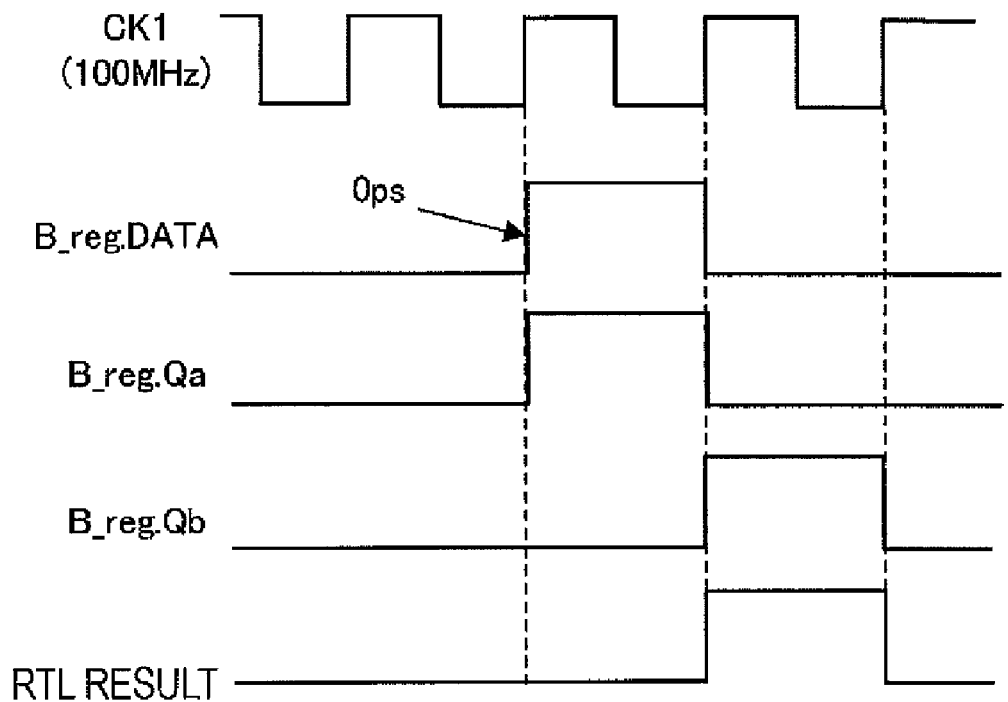
FIGS. 8A and 8B illustrate respectively a malfunction due to a delta delay in B_reg and a countermeasure for the delta delay.
Figure 8B:
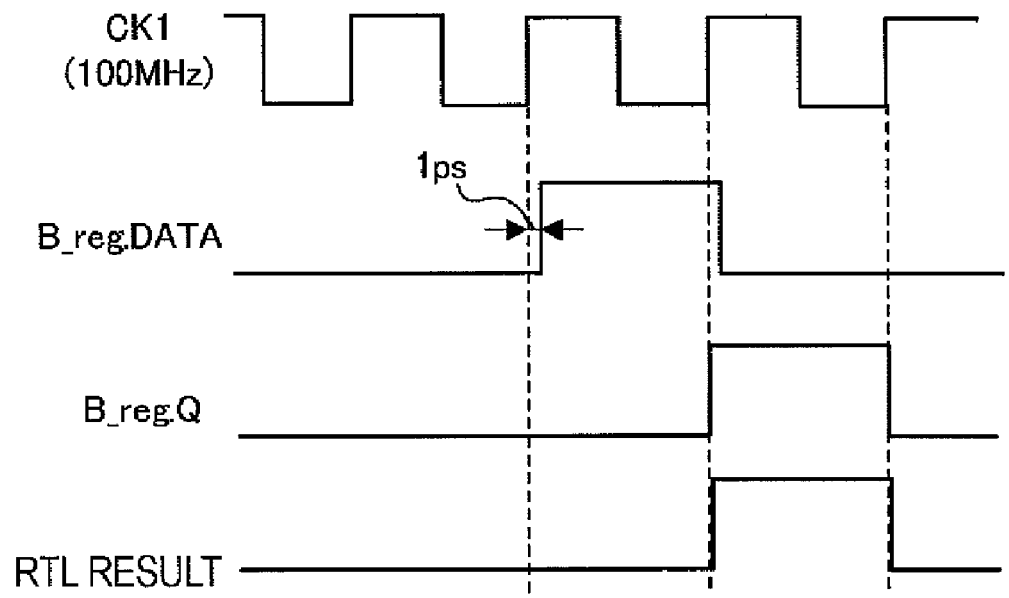

FIGS. 8A and 8B illustrate respectively a malfunction due to the delta delay in B_reg and a countermeasure for the delta delay.

As illustrated in FIG. 8A, when the delay value of the wiring coupled to a DATA terminal of B_reg is set to 0 ps, data change is differently separated into an output value B_reg.Qa when the rise of the clock signal CK1 is recognized as being after the change of the data input to the DATA terminal of B_reg, and an output value B_reg.Qb when the rise of the clock signal CK1 is recognized as being before the change of the data input to the DATA terminal of B_reg. In other words, when the rise of the clock signal CK1 is recognized as being after the data change, the operation differing from the intended RTL operation results.

On the other hand, the simulation result can be prevented from becoming unstable by setting the wiring delay value to +1 ps as illustrated in FIG. 8B, and the operation can be ensured to be the same as the intended RTL operation.

In operation S15, the delay value of the wiring coupled to the input terminal of the selected circuit cell is changed on both the rising side and the falling side of the signal if operation S13 determines that the selected circuit cell is the F/F cell on the receiving side of the asynchronous circuit section.

More specifically, the wiring delay value is changed, by way of example, as follows.

(1) on the rising side: 1 clock cycle−1 ps, and on the falling side: 1 ps
(2) on the rising side: 1 ps, and on the falling side: 1 clock cycle−1 ps
(3) on both the sides: 1 clock cycle−1 ps
(4) on both the sides: 1 ps In the case of C_reg in FIG. 2B, for example, four files of the delay information in SDF are prepared in which the wiring delay value on the DATA terminal side is changed in accordance with the above-described four methods. By processing the delay information in such a manner, the malfunction generating period in the asynchronous circuit section can be extended such that a malfunction can be easily detected in the simulation (as described in detail later).

After changing the wiring delay value on the receiving side of the asynchronous circuit section, the flow advances to operation S16.

In operation S16, it is determined whether the processing of the delay information has been completed for all the circuit cells. If the circuit cell remains for which the delay information is not yet processed, the procedure is repeated from operation S10. If the processing of the delay information has been completed for all the circuit cells, the delay information processing procedure is brought to an end. The processed delay information is stored in the database 14, shown in FIG. 4, as the delay information for the verification of the asynchronous circuit.

FIG. 9 illustrates an example of the delay information after processing.

More specifically, FIG. 9 illustrates a part of the contents of one of the four delay information files prepared by processing the delay information before processing, shown in FIG. 7, in accordance with the above-described four methods, i.e., a part of the contents of the file including the delay information processed in accordance with the above-described method (2).

With the foregoing procedure of operation S11 in FIG. 6, the path delay value is processed to 0 in all the circuit cells. Further, for each of A_reg and B_reg among the three F/F cells from the top of FIG. 9, "DELAY(ABSOLUTE(PORT DATA (1:1:1) (1:1:1) . . . " indicates that the wiring delay value of the wiring coupled to the DATA terminal of A_reg or B_reg is processed to 1 ps in operation S14.

C_reg including the third F/F cell from the top is the circuit cell on the receiving side of the asynchronous circuit section. In operation S15, the wiring delay value of the wiring coupled to the DATA terminal of C_reg is processed to (1:1:1) on the rising side and (9999:9999:9999) on the falling side.

The simulation unit 5 illustrated in FIG. 4 executes the verification of the asynchronous circuit based on the delay information for the verification of the asynchronous circuit, which has been prepared with the above-described process.

Figure 10:
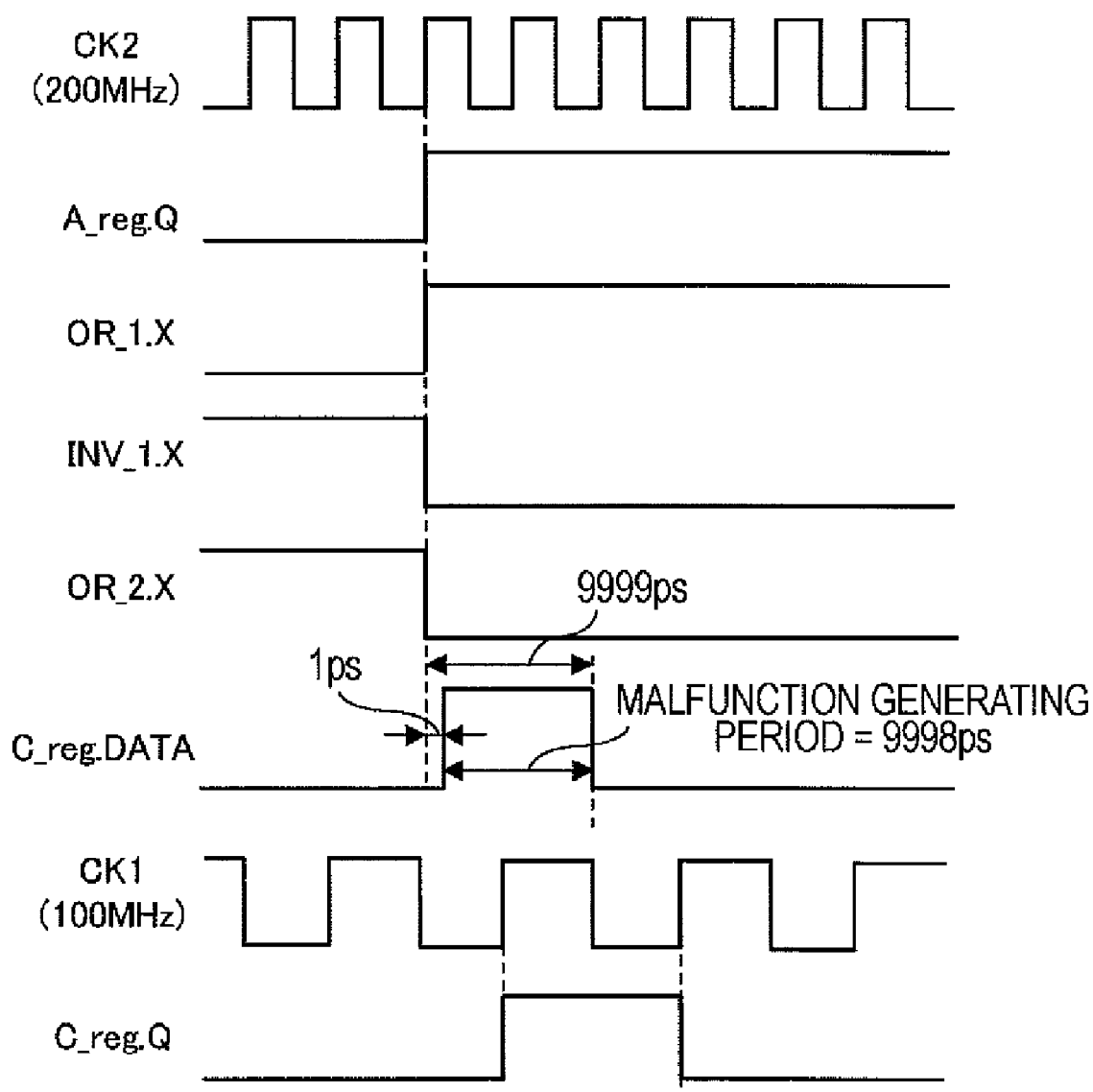
FIG. 10 illustrates a simulation result based on the delay information after processing.

FIG. 10 illustrates a simulation result based on the delay information after processing.

More specifically, FIG. 10 illustrates the simulation result when the delay information in FIG. 9 is employed, i.e., when the delay information processed by using the processing method (2) is employed. Note that B_reg.Q is assumed to be 0 and is omitted from FIG. 10. Various signals in FIG. 10 represent corresponding signals indicated in FIG. 2B.

Figure 3:
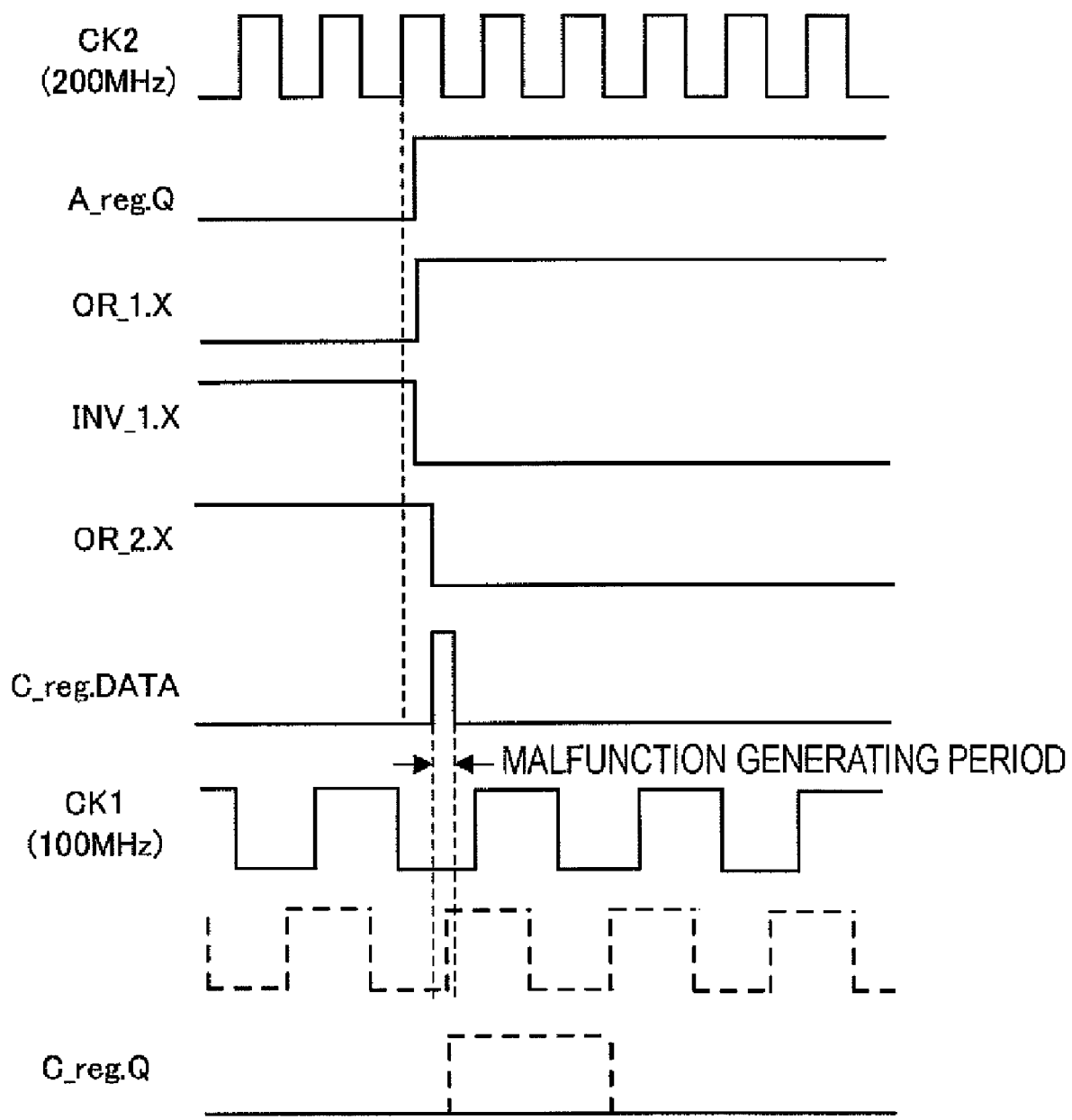
FIG. 3 illustrates an example of a malfunction caused in the asynchronous circuit.

If there is a hazard as illustrated in FIG. 3, the malfunction generating period specified by its pulse width is short and raises a difficulty in executing the verification. For example, when the path delay values of OR_1, OR_2, INV_1 and AND_1 in the asynchronous circuit of FIG. 2B are each 100 ps, the rising delay value of C_reg.DATA is given by 200 ps=100 ps (OR_1.A2→X)+100 ps (AND_1.A1→X) (wherein A1→X and A2→X each represent the path delay value from the input terminal to the output terminal of the relevant circuit cell (see FIG. 7)). On the other hand, the falling delay value is given by 300 ps=100 ps (INV_1.A→X)+100 ps (OR_2.A1→X)+100 ps (AND_1.A2→X). Accordingly, a period during which C_reg.DATA=1 is caused by the malfunction is given by 100 ps ~300 ps (falling delay value)–200 ps (rising delay value). Thus, it is very difficult to find the malfunction of 100 ps with respect to one cycle of the clock signal CK1, i.e., 10 ns.

In contrast, according to the embodiment, the malfunction generating period can be extended to 9998 ps by setting the delay value to 1 ps on the rising side and (1 clock cycle–1 ps=9999 ps) on the falling side based on the delay information shown in FIG. 9. Therefore, the malfunction can be easily detected for the verification without finely changing the phase of the clock signal CK1.

When the hazard is a falling pulse (i.e., a pulse taking 0 only for a short period), in contrast to the case of FIG. 3, the malfunction generating period can be extended similarly to the case of FIG. 9. The malfunction generating period can be extended by using the delay information that has been processed so as to provide the delay value of (1 clock cycle–1 ps) on the rising side and 1 ps on the falling side in accordance with the above-described method (1).

The reason why the delay value on the falling side is set by subtracting 1 ps from 1 clock cycle on the falling side resides in providing a countermeasure for the delta delay.

Figure 11A:
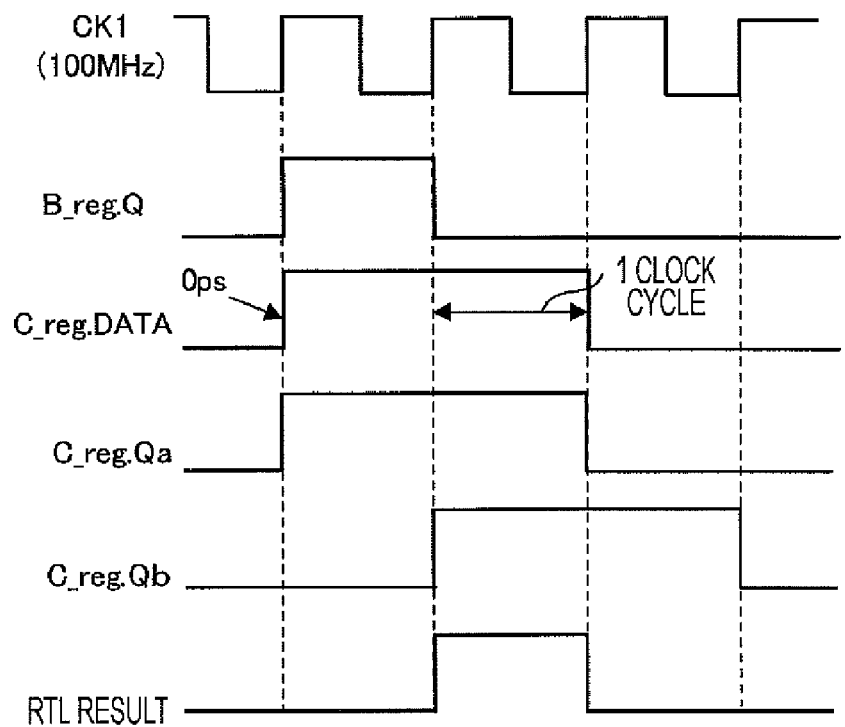
FIGS. 11A and 11B illustrate respectively a malfunction due to a delta delay in C_reg and a countermeasure for the delta delay.
Figure 11B:
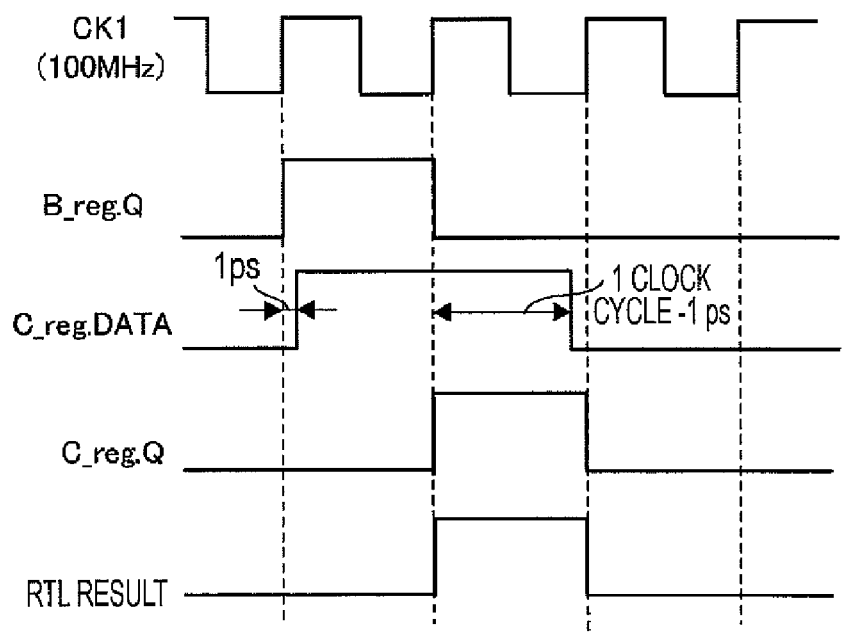

FIGS. 11A and 11B illustrate respectively a malfunction due to the delta delay in C_reg and a countermeasure for the delta delay.

As illustrated in FIG. 11A, when the wiring delay value of the wiring coupled to the DATA terminal of C_reg is set to 0 ps on the rising side and 1 clock cycle on the falling side, data change is differently separated into an output value C_reg.Qa when the rise of the clock signal CK1 is recognized as being after the change of the data input to the DATA terminal of C_reg, and an output value C_reg.Qb when the rise of the clock signal CK1 is recognized as being before the change of the data input to the DATA terminal of C_reg. In any case, the operation differing from the intended RTL operation results.

On the other hand, by setting the wiring delay value to +1 ps on the rising side and (1 clock cycle–1 ps) on the falling side as illustrated in FIG. 11B, the operation can be ensured to be the same as the intended RTL operation.

However, even when the malfunction generating period during which the hazard may occur is extended as illustrated in FIG. 10, a malfunction cannot be detected depending on the timing of the clock signal CK1.

Figure 12:
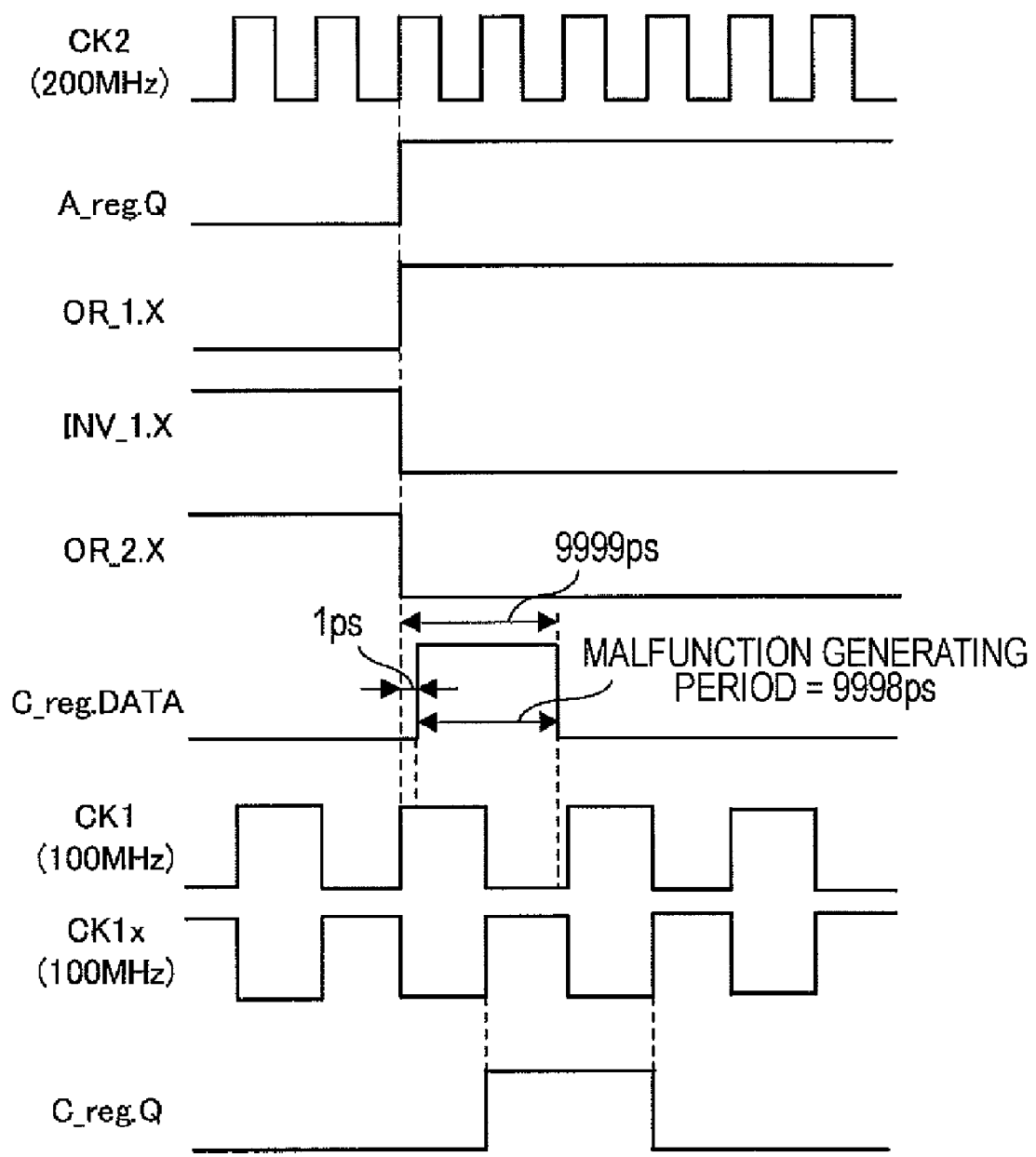
FIG. 12 illustrates a simulation result based on the delay information after processing when a malfunction cannot be detected, along with a countermeasure in that case.

FIG. 12 illustrates a simulation result based on the delay information after processing when a malfunction cannot be detected, along with a countermeasure in that case.

When the delay information processed in accordance with the above-described method (1) or (2) is used, there is a period of 2 ps during which the malfunction cannot be caused to generate for detection. Accordingly, if the clock signal CK1 is input at the timing illustrated in FIG. 12, the rising edge of the clock signal CK1 is not included within a period during which C_reg.DATA takes 1. Even in such a case, the malfunction can be reliably detected without changing the phase of the clock signal CK1 many times little by little for fine adjustment. The malfunction can be detected, in particular, by executing an additional simulation only one time with a clock signal CK1x which is obtained by reversing the phase of the clock signal CK1. The clock signal CK1x is not always limited to one obtained by reversing the phase of the clock signal CK1. The clock signal CK1x may be any other suitable clock signal obtained by shifting the phase of the clock signal CK1 through 2 ps or more.

The asynchronous circuit section extracted by the extraction unit 3 is not limited to the case including the F/F illustrated in FIG. 2B, and it may also include an F/F having an EN (enable) terminal.

Figures 13A, 13B:
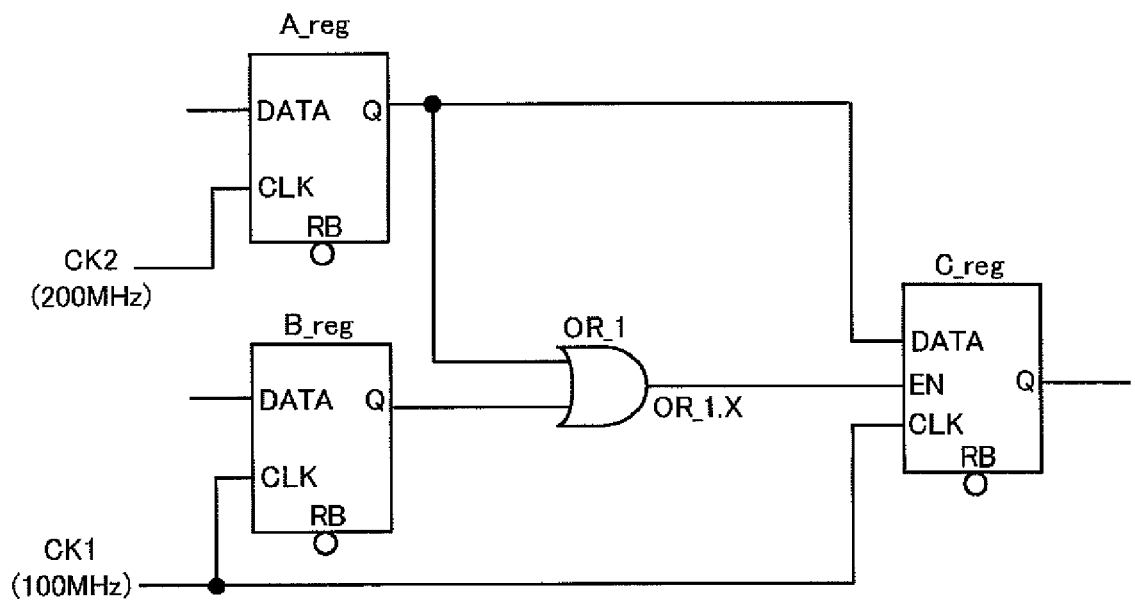
FIGS. 13A and 13B illustrate another example of the asynchronous circuit; specifically.

FIGS. 13A and 13B illustrate another example of the asynchronous circuit; specifically, FIG. 13A illustrates an RTL description and FIG. 13B illustrates an asynchronous circuit represented by a netlist after logical synthesis.

The portion of the RTL described in FIG. 13A shows that, in sync with the rise of the clock signal CK1, 1 is substituted in C if A is 1, and 0 is substituted in C if A is other than 1 and B is 1. Although only one path exists from A to C in the RTL description, two paths may be generated between A_reg and C_reg, as illustrated in FIG. 13B, in a netlist that is produced after the logical synthesis. The two paths include one extending from A_reg to a DATA terminal of C_reg, and the other extending from A_reg to an EN terminal of C_reg through OR_1. The following malfunction may be caused in such an asynchronous circuit.

Figure 14:
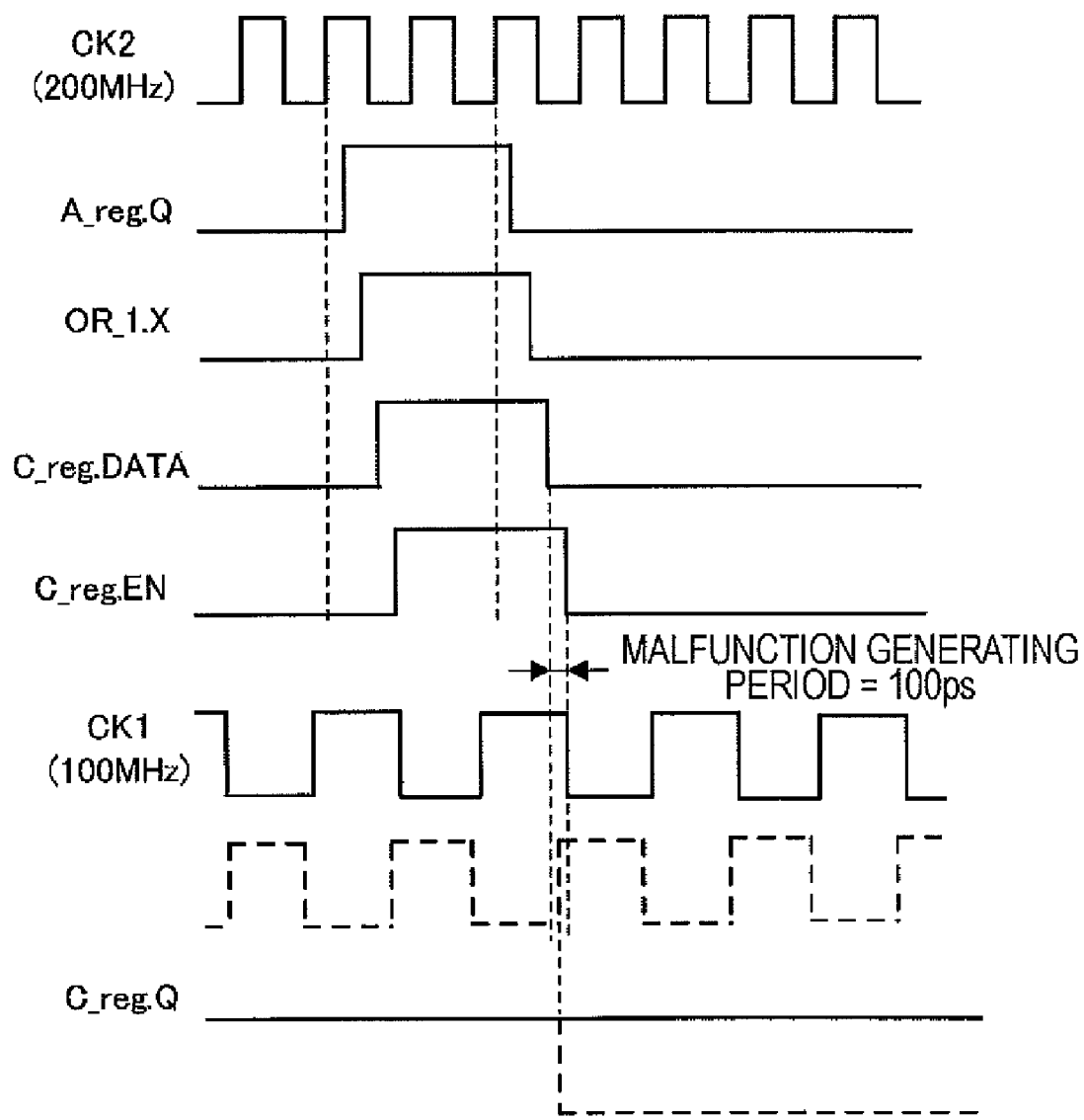
FIG. 14 illustrates an example of a malfunction caused in the asynchronous circuit of FIG. 13B.

FIG. 14 illustrates an example of the malfunction caused in the asynchronous circuit.

More specifically, FIG. 14 illustrates the simulation result of the asynchronous circuit in FIG. 13B, which is produced by the logical synthesis. Note that B_reg.Q, is assumed to be 0 and is omitted from FIG. 14. Various signals in FIG. 14 represent corresponding signals indicated in FIG. 13B.

According to the RTL description in FIG. 13A, when B=0 and C=1 are held, C does not become 0 even if A is changed from 0 to 1 or from 1 to 0. In the asynchronous circuit illustrated in FIG. 13B, however, two paths may be produced and a period in which C_reg.EN is 1 and C_reg.DATA is 0 may be generated depending on a delay difference between those two paths. If the rising edge of the clock signal CK1 comes within such a period, C_reg.Q becomes 0, which differs from the RTL logic, thus causing a malfunction. Such a period represents the malfunction generating period and is as short as 100 ps. If the malfunction generating period is so short, a operation of detecting the malfunction for verification requires adjustment to raise the clock signal CK1 in a short period and therefore takes time for the verification.

Even in that case, the malfunction can be effectively detected by using the delay information that has been processed in accordance with the above-described methods (3) and (4).

The delay information processing unit 4 processes the delay information as illustrated in FIG. 6. In operation S13 in FIG. 6, C_reg having the EN terminal is selected, and in operation S15, the wiring delay value of the wiring coupled to each input terminal (DATA terminal and EN terminal) is processed in accordance with the above-described four methods.

Figure 15:
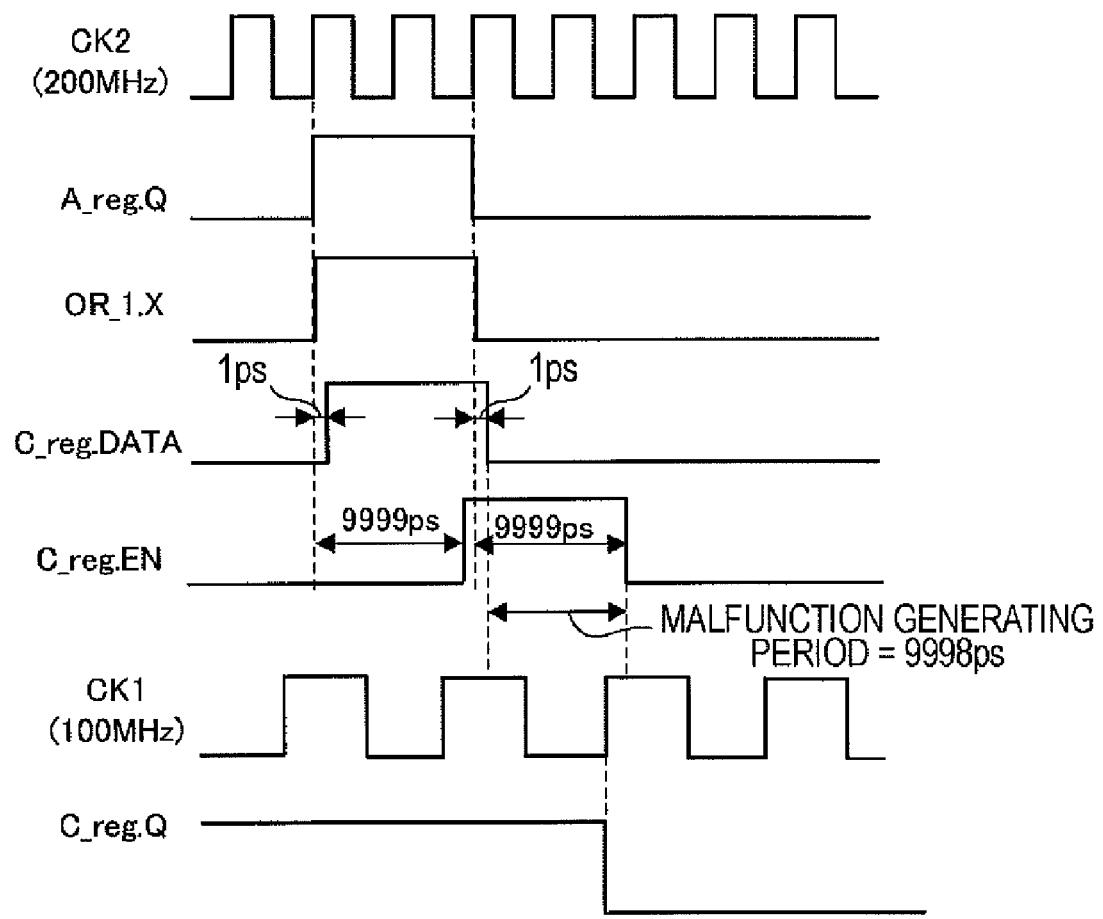
FIG. 15 illustrates a simulation result based on delay information after processing.

FIG. 15 illustrates a simulation result based on the delay information after processing.

More specifically, FIG. 15 illustrates the simulation result obtained by using, for C_reg.DATA, the delay information processed in accordance with the above-described method (4) such that a delay of 1 ps is caused in each of the rising and falling sides, and using for C_reg.EN, the delay information processed in accordance with the above-described method (3) such that a delay of (1 clock cycle−1 ps) (i.e., a delay of 9999 ps because one cycle of the clock signal CK1 is 10 ns) is caused in each of the rising and falling sides. Note that B_reg.Q is assumed to be 0 and is omitted from FIG. 15. Various signals in FIG. 15 represent corresponding signals indicated in FIG. 13B.

By using the delay information processed in accordance with the above-described method (3) and (4) as described above, the malfunction generating period in which C_reg.DATA is 0 and C_reg.EN is 1 can be extended to 9998 ps. As a result, the malfunction can be easily detected for the verification without finely changing the phase of the clock signal CK1.

In the case of FIG. 15, as in the above-described case of FIG. 12, the malfunction can also be reliably detected regardless of the timing of the clock signal CK1 by executing additional simulation only one time with a clock signal which is obtained by reversing the phase of the clock signal CK1.

Thus, the malfunction can be detected with less labor and in a shorter time by producing, for signals on the input terminal side (e.g., at the DATA terminal and the EN terminal in FIG. 13B), the delay information processed in accordance with the methods (1) to (4), and executing the verification through simulation based on the produced delay information.

When the malfunction is not detected as a result of executing the simulation that can reliably detect the malfunction caused in the asynchronous circuit section, the layout procedure of operation S84 in FIG. 1 is executed. Then, the design process is executed in a similar manner to the known design process (including the formal verification, etc.). When the malfunction is detected, the RTL description in the problematic circuit section is changed before advancing to the layout.

The above-described delay information for the verification of the asynchronous circuit is not used after the verification of the asynchronous circuit is executed and completed. After the netlist and the delay information of actual wiring, which has been subjected to timing adjustment, addition of a test circuit, etc. based on the layout, are produced as illustrated in the flow of the circuit design and the verification illustrated in FIG. 1, the produced delay information is used. In other words, the malfunction caused in the asynchronous circuit section, which cannot be found in the RTL description, can be easily found without changing the known flow of the circuit design and the verification to a large extent.

Further, since the verification is performed to find the malfunction before the layout procedure and the RTL description is corrected based on the verification result, the time and the cost can be greatly reduced as compared with the case where, after finding the malfunction in the asynchronous circuit with evaluation of the actual circuit, the RTL description is corrected and a prototype circuit is manufactured again, followed by the evaluation.

Since the netlist is not required to be changed for the verification of the asynchronous circuit and only the delay information is required to be changed, time is not taken to construct an environment for the verification.

Since, during processing of the delay information, the malfunction generating period is extended by setting the path delay value of each circuit cell to 0 and by processing the wiring delay value of the wiring coupled to each of the DATA terminal and the EN terminal on the receiving side of the asynchronous circuit section, the delay information can be easily processed.

The above-described procedures of the design process can be realized by using a computer. In that case, a program describing processing functions to be implemented by the verification apparatus 1 is provided. With the computer executing the program, the processing functions of the verification apparatus 1 are realized on the computer. The program describing the processing functions can be recorded on a computer-readable recording medium. The computer-readable recording medium is, for example, a magnetic recording device, an optical disk, a magneto-optical recording medium, and a semiconductor memory. The magnetic recording device includes an HDD, a flexible disk (FD), a magnetic tape, etc. The optical disk includes a DVD (Digital Versatile Disc), a DVD-RAM, a CD-ROM, a CD-R (Recordable)/RW (Re-Writable), etc. The magneto-optical recording medium includes an MO (Magneto-optical disk).

The program can be distributed to users, for example, by marketing a portable recording medium, e.g., a DVD or a CD-ROM, which records the program thereon. As an alternative, the program may be stored in a memory of a server computer and transferred from the server computer to other computers via a network.

The computer executing the program stores in its own memory the program which is, for example, recorded on the portable recording medium or transferred from the server computer. Then, the computer reads the program from its own memory and executes processing in accordance with the program. Alternatively, the computer can read directly from the portable recording medium and execute processing in accordance with the program. Further, each time the computer receives the program transferred from the server computer, the computer can execute processing in accordance with the received program.

While the present invention has been described above in connection with the embodiment, the embodiment is not limited to the illustrated one and can be variously modified within the scope of the invention defined in claims.

According to the above-described method, the delay information 12 and the asynchronous circuit section 13 are extracted after producing the netlist 11, and the delay information 12 is processed so as to extend the malfunction generating period in the asynchronous circuit section 13. Therefore, the malfunction can be easily found when the asynchronous circuit is verified.

Thus, it is possible to easily find the malfunction in the verification of the asynchronous circuit and to verify the asynchronous circuit in a shorter time by extracting both the delay information and the asynchronous circuit section after producing the net lest and by processing the delay information so as to extend the malfunction generating period in the malfunction generating period.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A logical verification method for verifying an asynchronous circuit using a processor, the method comprising:
   producing a netlist based on circuit information at a register transfer level with the processor;
   extracting delay information and an asynchronous circuit section in which circuits operating with different clock signals are coupled to each other from the netlist;
   processing the delay information to extend a period that generates a malfunction in the asynchronous circuit section; and
   executing verification of the asynchronous circuit based on the delay information having been processed.

2. The logical verification method according to claim 1, further comprising:
   processing the delay information;
   changing a wiring delay value of wiring coupled to an input terminal of an information receiving-side circuit in the asynchronous circuit section; and
   extending the malfunction generating period.

3. The logical verification method according to claim 1, further comprising processing the delay information such that a delay time from an input to an output of each circuit cell in the netlist is set to 0.

4. The logical verification method according to claim 1, further comprising:
   processing the delay information; and
   setting a wiring delay value of wiring coupled to an input terminal of the flip-flop to a minimum setting value when the circuit cell is a flip-flop.

5. The logical verification method according to claim 1, further comprising:
   processing the delay information;
   subtracting a minimum setting value from a cycle of a clock signal input to the receiving-side circuit, on the falling side thereof, to obtain a value; and
   setting the wiring delay value of the wiring, which is coupled to the input terminal of a receiving-side circuit, to the minimum setting value on the rising side of a signal transmitted through the wiring and to the value.

6. The logical verification method according to claim 1, further comprising:
   processing the delay information;
   subtracting a minimum setting value from a cycle of a clock signal input to a receiving-side circuit, on the rising side of a signal transmitted through the wiring and to the minimum setting value on the falling side thereof, to obtain a value; and
   setting the wiring delay value of the wiring, which is coupled to the input terminal of the receiving-side circuit, to the value.

7. The logical verification method according to claim 1, further comprising:
   processing the delay information; and
   setting a wiring delay value of the wiring, which is coupled to the input terminal of the receiving-side circuit, to a minimum setting value on each of the rising side and the falling side of a signal transmitted through the wiring.

8. The logical verification method according to claim 1, further comprising:
   processing the delay information;
   subtracting a minimum setting value from a cycle of a clock signal input to a receiving-side circuit, on each of the rising side and the falling side of a signal transmitted through the wiring to obtain a value; and
   setting a wiring delay value of the wiring, which is coupled to an input terminal of the receiving-side circuit, to the value.

9. The logical verification method according to claim 1, further comprising executing the verification when a clock signal is input and when a reversed clock signal obtained by reversing the clock signal is input.

10. The logical verification method according to claim 4, wherein the input terminal is a data terminal or an enable terminal of the flip-flop.

11. A logical verification apparatus for verifying an asynchronous circuit, comprising:
    a logical synthesis section producing a netlist based on circuit information at a register transfer level;
    an extraction section extracting, from the netlist, delay information and an asynchronous circuit section in which circuits operating with different clock signals are coupled to each other;
    a delay information processing section processing the delay information to extend a period that is generating a malfunction in the asynchronous circuit section; and
    a simulation section executing verification of the asynchronous circuit based on the delay information having been processed.

12. A program stored on a non-transitory computer readable storage medium and causing a computer to execute a process for verifying an asynchronous circuit, the program comprising operation of the computer to function as:
    a logical synthesis section producing a netlist based on circuit information at a register transfer level;
    an extraction section extracting, from the netlist, delay information and an asynchronous circuit section in which circuits operating with different clock signals are coupled to each other;
    a delay information processing section processing the delay information to extend a period that is generating a malfunction in the asynchronous circuit section; and
    a simulation section executing verification of the asynchronous circuit based on the delay information having been processed.

* * * * *